Feb. 27, 1923.

W. H. ALDRIDGE

TIRE CARRIER

Filed June 21, 1921

1,446,535

INVENTOR
W. H. Aldridge
BY
ATTYS

Patented Feb. 27, 1923.

1,446,535

UNITED STATES PATENT OFFICE.

WILLIAM HENRY ALDRIDGE, OF WINNIPEG, MANITOBA, CANADA.

TIRE CARRIER.

Application filed June 21, 1921. Serial No. 479,272.

*To all whom it may concern:*

Be it known that I, WILLIAM HENRY ALDRIDGE, of the city of Winnipeg, in the Province of Manitoba, Canada, have invented certain new and useful Improvements in Tire Carriers, of which the following is the specification.

The invention relates to improvements in tire carriers and the object of the invention is to provide a simply constructed, easily applied carrier for automobile tires which is designed to carry one or two spare tires as desired and is arranged so that the tires can be easily inserted or removed and such that it can be positively locked to prevent the tires from being stolen.

With the above objects in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

Figure 1:
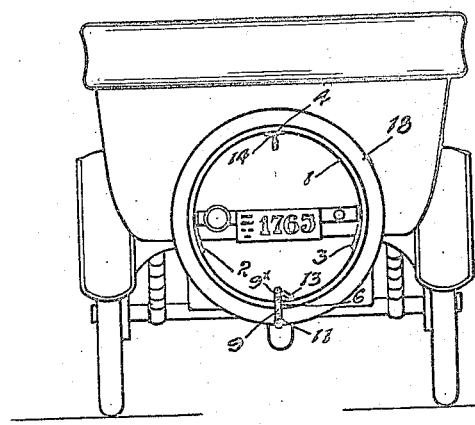
Fig. 1 is a rear view of an automobile showing my invention applied thereon.

1 is the customary carrier ring permanently mounted at the rear of the automobile and supported by the customary right and left lower brackets 2 and 3 extending rearwardly from the chassis and the upper centrally disposed top bracket 4 extending rearwardly from the body of the car.

The ring 1 has the inner side flanged outwardly as indicated at 5 in the usual manner and the parts above described are of ordinary construction, being at present found on certain types of automobiles. The arrangement however is designed for carrying only one spare tire, the tire being mounted on the ring and suitably locked thereon.

According to my invention I can carry one or two spare tires as desired and I accomplish this by providing the parts now described.

6 is a holder formed from three interconnected parts, an attaching part 7, a tire supporting part 8 and a locking part 9. The part 7 is secured such as by riveting to the inner side of the ring 1 at the bottom and has one end upturned to provide a fastening lug 7' and the other end downturned at the inner edge of the ring and connected by means of a hinged joint 10 to the part 9.

The part 8 presents an upturned end 8' attached by the hinge 10 to the part 7 and a rearwardly extending horizontally disposed part $8^a$ fitted more or less centrally of its length with an upwardly projecting spacer $8^x$ having the rear end thereof curved upwardly and connected by a hinged joint 11 to the downturned end 9' of the part 9.

The front end of the part 9 is supplied with an upturned lug $9^x$ adapted to bear against the lug 7' and both lugs are fitted with registering openings 12 adapted to receive a padlock indicated at 13.

When the holder is in position on the ring it will be seen that the part 8 underlies and extends considerably to the rear of the ring and that when the lugs are locked together there are two pockets formed by the holder and spaced by the spacer $8^x$ the pockets being designed to receive two tires side by side.

To the upper ring 1 permanently secure as by riveting a centrally rearwardly extending hanger 14 which has an upturned tongue like end 15 and is provided with a hole 16 to receive the valve of the tire placed thereon. The hinges 10 and 11 are placed to allow the tires to be readily inserted or removed from the holder.

Figure 3:
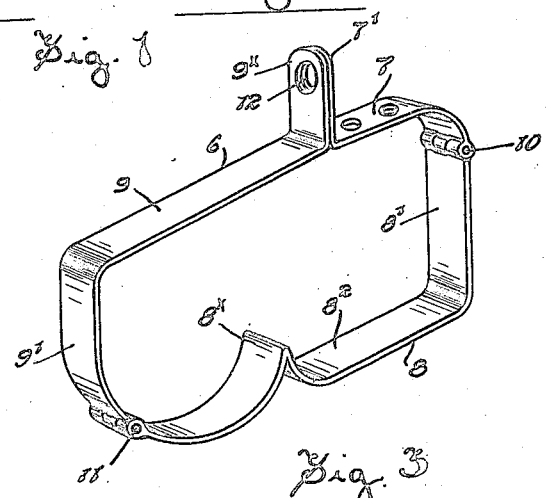
Fig. 3 is a perspective view of the lower holder.
Figure 2:
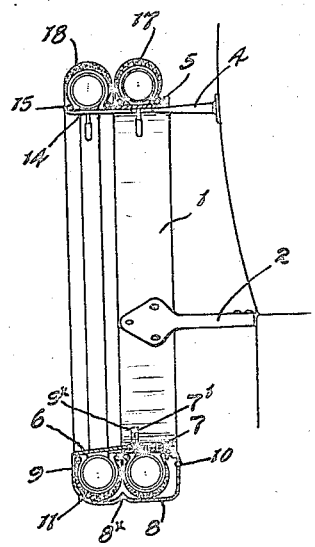
Fig. 2 is a vertical sectional view centrally through the tire carrier.
Figure 4:
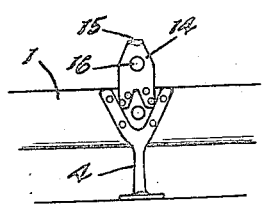
Fig. 4 is an inverted plan view of the top bracket.

When an automobile is equipped with my invention the first spare tire indicated at 17 is placed on the ring 1 in the ordinary way and then the second spare tire indicated at 18 is suspended from the hanger 14, the valve being passed through the opening 16. The attendant then catches the free end of the holder and swings it up to the position best shown in Figures 2 and 3, bringing the lugs together and locking them by the padlock provided. In closing the holder 6 it will be seen that the part 8 will first spring up to a horizontal position turning on the hinge 10 and then the part 9 will be swung to bring the lugs together, such part turning on the hinge 11. When the holder is locked the two tires are effectively held in the pockets provided and are spaced by the spacer $8^x$. Obviously it is an easy matter to remove the tires as once the padlock is undone the part 9 can be swung upwardly and rearwardly to clear the tires and then both the parts 9 and 8 drop, the part 8 swinging downwardly on the hinge 10.

What I claim as my invention is:—

1. A device of the character described, comprising a seat member affording a plurality of tire seats, arms hinged to opposite ends of said seat member and provided with complementary abutting portions, and means securing said arms together in a position overlying said seats.

2. A device of the character described, comprising a seat member affording a plurality of tire seats, arms hinged to opposite ends of the seat member and complementary lugs carried by said arms adapted for abutting engagement and apertured for passage of a locking means therethrough.

3. A device of the character described, comprising a seat member affording a plurality of tire seats, arms hinged to opposite ends of the seat member, complementary outwardly extending apertured lugs carried by the free ends of the arms and adapted for abutting engagement and a pad-lock having its shackle passing through said lugs to secure the arms together.

4. The combination with the spare tire supporting rim of a vehicle, of a supplementary support comprising a seat member comprising a plurality of seats and positioned to dispose one of said seats directly beneath the rim for engagement with a tire arranged on the rim, the remaining seat being disposed to one side of the rim to support a second tire, an arm hinged to one end of the seat member and fastened to one side of the rim, a second arm hinged to the remaining end of the seat member and operable into abutting engagement with the first arm, and means for securing the abutting portions of the arms together.

Signed at Winnipeg, this 2nd day of June, 1921.

WILLIAM HENRY ALDRIDGE.

In the presence of—
GERALD S. ROXBURGH,
W. C. BOGGESS.